United States Patent
Naskali

(10) Patent No.: US 6,713,209 B1
(45) Date of Patent: *Mar. 30, 2004

(54) ARRANGEMENT FOR IMPLEMENTING A SAFETY FEATURE IN A BATTERY

(75) Inventor: Matti Naskali, Yliskulma (FI)

(73) Assignee: Nokia Mobile Phones, Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,714

(22) Filed: Apr. 29, 1999

(30) Foreign Application Priority Data

Apr. 30, 1998 (FI) .................................................. 980962

(51) Int. Cl.[7] ...................... H01M 10/34; H01M 10/52; H01M 2/00
(52) U.S. Cl. ............................. 429/57; 429/56; 429/59
(58) Field of Search ........................... 429/57, 59, 163, 429/56

(56) References Cited

U.S. PATENT DOCUMENTS

| | | | |
|---|---|---|---|
| 4,633,365 A | 12/1986 | Stockman | 361/272 |
| 4,756,983 A | 7/1988 | Tuchoiski | 429/61 |
| 4,965,149 A | * 10/1990 | Ashihara et al. | 429/168 |
| 5,405,715 A | 4/1995 | Dawson et al. | 429/54 |
| 5,609,972 A | 3/1997 | Kaschmitter et al. | 429/56 |
| 5,877,564 A | 3/1999 | Kuiri | 307/38 |

FOREIGN PATENT DOCUMENTS

| | | |
|---|---|---|
| EP | 0 862 230 A2 | 9/1998 |
| JP | 63237360 | * 10/1988 |
| WO | WO 94/10712 | 5/1994 |

OTHER PUBLICATIONS

Patent Abstracts of Japan JP 63 237360.
Patent Abstracts of Japan JP 06 215755.

* cited by examiner

Primary Examiner—Patrick Ryan
Assistant Examiner—Julian Mercado
(74) Attorney, Agent, or Firm—Perman & Green, LLP

(57) ABSTRACT

The invention pertains to a safety feature that finds particular utility in batteries with flexible shells. Conductors to be attached to the electrodes of a battery are thin strips, and the strength of such a conductive strip (20) is reduced at one point e.g. by cutting a slit (22) on its side. At one side of the slit the conductive strip is attached to the top part (61) of the battery shell, and at the other side of the slit to the bottom part (62) of the battery shell. If overcharging, for instance, generates an overpressure inside the battery, the battery shell bulges and tears (B) the conductive strip in two starting at the slit. This way, the structures and equipment around the battery will avoid damage possibly caused by battery chemicals or high temperature. The arrangement according to the invention makes separate internal battery protection components redundant and has low costs.

7 Claims, 2 Drawing Sheets

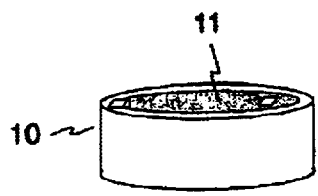 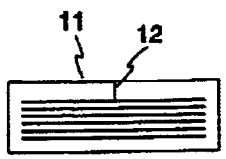 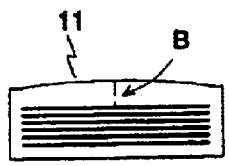
Fig. 1a          Fig. 1b          Fig. 1c   PRIOR ART
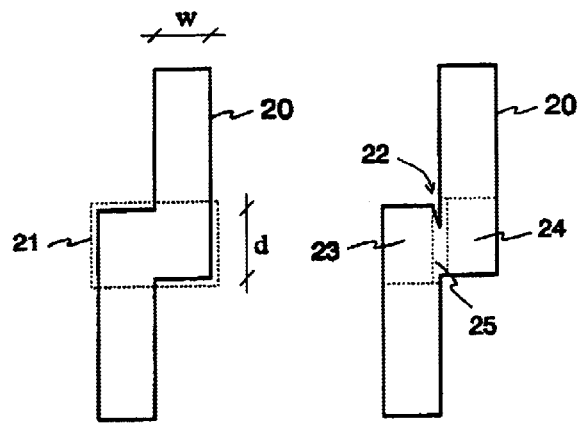 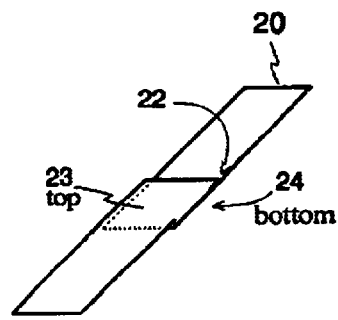
Fig. 2a          Fig. 2b          Fig. 2c
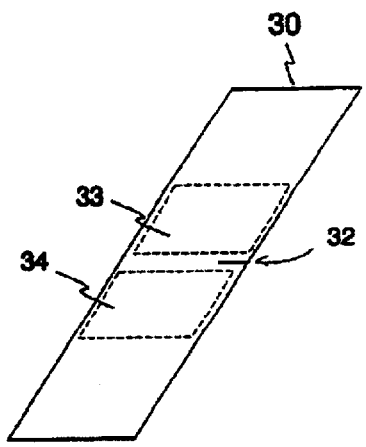 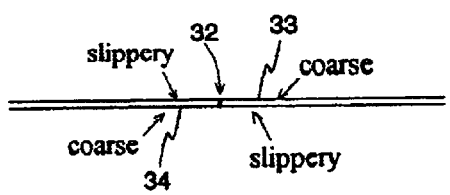
Fig. 3a          Fig. 3b

ARRANGEMENT FOR IMPLEMENTING A SAFETY FEATURE IN A BATTERY

TECHNOLOGICAL FIELD

The invention relates to the technological field of structures used for preventing rechargeable electrical batteries from causing damage to their surroundings.

BACKGROUND OF THE INVENTION

Misuse, such as overcharging, of a battery may result in generation of gas inside the battery and, hence, an increase in the internal pressure of the battery. The pressure may cause corrosive substances to spread outside the battery, resulting in damage to nearby circuits and equipment. In addition, misuse of the battery may result in a relatively dramatic build-up of thermal energy in the battery if electrical energy is no longer chemically absorbed. Accumulation of heat may also cause damage to structures around the battery.

Misuse of a battery is usually prevented by means of a safety circuit in the charging device: The battery voltage is monitored, and when it has reached a predetermined level corresponding to full charge, the charging current is electronically switched off. The charging current is not switched back on until the battery voltage has dropped to a second level considerably lower than the first one. Such an external safety circuit by itself provides inadequate protection. The charging device may become faulty so that the protection will not work. Furthermore, the battery may be connected to a charging device of an incorrect type, or even the wrong way around by its terminals. Safe batteries therefore have got internal protection in case of misuse.

From the prior art it is known internal battery protection methods as follows:

Use of internal protective components: A positive temperature coefficient (PTC) thermal resistor is placed in the battery circuitry. When the charging current is too large or the battery heats up because of chemical reasons the resistance of the thermal resistor rises, causing the charging current to drop. A disadvantage with the use of a thermal resistor is the limited protection it offers: A slight overcharging state may persist for a long time. In addition, a thermal resistor increases energy consumption during normal operation of the battery. Similarly, a thermal fuse can be placed in the battery circuitry. As the temperature of the battery reaches a certain limit, the thermal fuse disconnects the charging circuit. A disadvantage with the use of a thermal fuse is the energy consumption caused by it during normal operation of the battery.

Use of internal protective circuits: An electronic circuit is placed in the battery, sensing the battery current and voltage. If during the charging of the battery the behavior of the current or voltage deviates from the normal, said protective circuit disconnects the charging current. A disadvantage with the use of a protective circuit is that it increases the battery manufacturing costs. An additional disadvantage in this case, too, is that the energy consumption increases during normal operation of the battery.

Use of gas hole or valve: A small hole is made on a battery cell or a valve is placed in it such that gas possibly generated inside the battery can exit the battery. This eliminates a considerable increase in pressure and spreading of chemicals outside the battery in cases of gross misuse. There is, however, the disadvantage of heat accumulation in the battery and structures around it if the overcharging state is prolonged.

Mechanical disconnection of the charging circuit: FIG. 1 shows a breakable construction. On one side of a battery 10 there is a foil 11 made of a relatively thin conductive material. The battery charging circuit comprises a thin conductor 12 attached to the foil 11. The battery is hermetically sealed. If the battery is overcharged, the pressure of the gas generated distends the foil 11 as shown in FIG. 1c. As the pressure exceeds a certain threshold the conductor 12 breaks in two at point B and the charging current is disconnected. A disadvantage of the method is that it is only applicable to batteries which apart from said foil have a hard shell.

SUMMARY OF THE INVENTION

An object of the invention is to reduce said disadvantages related to the prior art. The protection method according to the invention is characterized by what is expressed in independent claim. Preferred embodiments of the invention are presented in the dependent claims.

The basic idea of the invention is as follows: A battery is manufactured such that pressure generated inside it will cause at least one of the battery's conductors to tear in two, thus interrupting the flow of current through said conductor. To that end, the battery shell is made at least partly of a flexible material and is hermetically sealed. Said conductors are thin strips and their strength, or at least the strength of one of them, is reduced at one point e.g. by cutting a slit on a side of the conductor. The conductive strip is attached at one side of said point to the upper portion of the battery shell and at the other side to the lower portion of the battery shell. If pressure is generated inside the battery because of misuse, the pressure will distend the battery shell and the upper and lower portions of the shell will tear the conductive strip in two. A relatively small amount of force will suffice to accomplish that because the "tearing" has been started in advance by making said slit.

An advantage of the invention is that an increase in the internal pressure of a battery will not result in the spreading of corrosive chemicals outside the apparatus. Another advantage of the invention is that the charging of a battery is stopped before the battery will heat up its surroundings possibly to a damaging extent. A further advantage of the invention is that protection according to the invention will not cause extra energy consumption during normal operation of the battery. A yet further advantage of the invention is that it finds particular utility in batteries having a flexible construction; say, lithium polymer batteries, which are becoming more popular and for which there is no effective protection at the moment. Yet another advantage of the invention is that the costs of the arrangement according to the invention are relatively small. The costs are brought down among other things by the fact that the invention will make protective components redundant.

BRIEF DESCRIPTION OF THE DRAWINGS

The invention will now be described in more detail. Reference will be made to the accompanying drawing wherein FIG. 1 shows a known conductor-breaking construction, FIG. 2 shows an example of the conductive strip according to the invention, FIG. 3 shows a second example of the conductive strip according to the invention.

Figure 4:
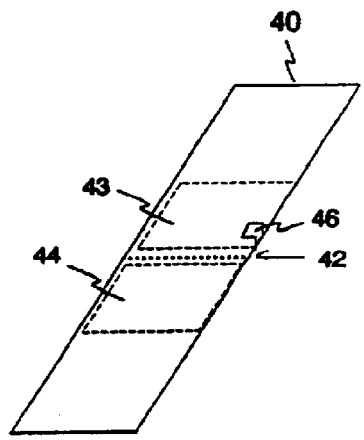
FIG. 4 shows a third example of the conductive strip according to the invention.

The construction in FIG. 1 and its operation were already discussed in conjunction with the description of the prior art.

DETAILED DESCRIPTION OF THE INVENTION

FIG. 2 shows an example of the conductive strip according to the invention. A strip 20 having a width w at both ends has been cut from a thin metal sheet. The shape of the strip has a transition corresponding roughly to the width w as shown in FIG. 2a. Transition means that for the length d of the transition area 21 the width of the strip is about 2 w and that after the transition area 21 the strip continues with the same width and direction as before the transition area but moved to the side for the width w. The strip portion corresponding to the transition area 21 is divided into a first part 23, second part 24 and a relatively narrow intermediate part 25 between the first and second parts. The intermediate part 25 is located in the middle of the strip 20 such that it divides the strip into two substantially rectangular parts. FIG. 2b shows a relatively small slit 22 cut in the intermediate part 25 of the strip 20 such that the slit is parallel to the edge on the other side of the transition area. Naturally the slit can be cut at the same time that the strip itself is cut from the sheet. In FIG. 2c the strip 20 has been bent 180° along the continuation of the slit 22 in the intermediate part 25 so that the first part 23 and second part 24 of the conductive strip have become placed one on top of the other. The slit 22 is then located at the edge of the construction, parallel to the edge. The strip 20 is meant to be attached to the battery shell by its first and second parts.

FIG. 3 shows a second example of the conductive strip according to the invention. FIG. 3a shows a transversal slit 32 at the edge of a straight conductive strip 30. A first part 33 of the conductive strip is located from the slit 32 and its imaginary continuation towards a first end of the conductive strip, and a second part 34 is located towards a second end of the conductive strip. The upper surface of the first part and the lower surface of the second part are made coarse and the corresponding surfaces on the opposite sides of the conductive strip are made slippery as shown in FIG. 3b. The sealing compound on the battery shell sticks to the coarse surfaces considerably more tightly than to the slippery surfaces. Thus, the first part 33 is attached to the top part of the battery shell and the second part 34 to the bottom part of the battery shell. As the shell bulges, a moment is created in the conductive strip 30 the forces of which tear the conductive strip in two beginning at the slit 32. The "top part" and "bottom part" of the battery shell refer to the near-planar opposite halves of said shell. Similarly, the "upper surface" of the conductive strip or its part refers to said part's surface facing the top part of the battery shell, and the "lower surface" of the conductive strip or its part refers to said part's surface facing the bottom part of the battery shell. So, in the description and particularly in the claims, the top part and bottom part of the shell and the upper part and lower part of the conductive strip or its part are in no way related to the operating position of the battery.

FIG. 4 shows a third example of the conductive strip according to the invention. A row 42 of relatively small perforations have been made transversally across a straight conductive strip 40. The spacing of perforations is so small that a force possibly directed to the battery shell by overpressure suffices to tear the conductive strip 40 in two. To attach the first part 43 of the conductive strip, said part 43 has a protrusion 46 which is meant to be positioned inside or between the structures of the top part of the battery shell. The second part 44 may of course have a similar protrusion.

Figure 5:
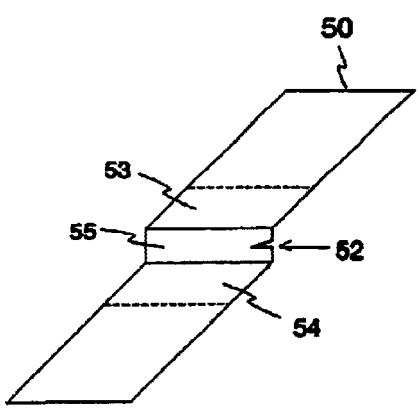
FIG. 5 shows a fourth example of the conductive strip according to the invention.

FIG. 5 shows a fourth example of the conductive strip according to the invention. A conductive strip 50 is bent 90° at two locations so that the ends of the conductive strip point to opposite directions. Between the bends there is a relatively narrow intermediate part 55. A slit 52 has been made at the edge of the conductive strip in the intermediate part 55. A first part 53 of the conductive strip is located from the intermediate part 55 towards a first end of the conductive strip, and a second part 54 of the conductive strip is located from the intermediate part 55 towards a second end of the conductive strip.

Figure 6A:
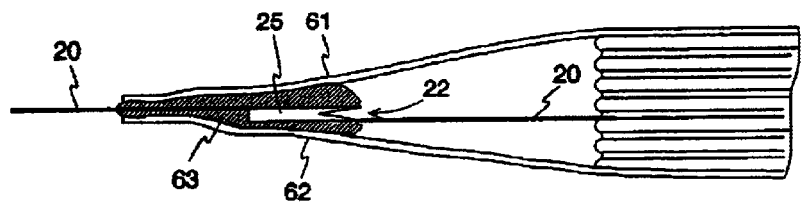
FIG. 6 illustrates the behavior of the conductive strip according to FIG. 2 in overpressure.

FIG. 6a shows a longitudinal section of one end of a battery according to the invention. The battery employs at least one conductive strip 20 according to FIG. 2. The intermediate part 25 of the conductive strip 20, bent 180°, is viewed from the side. A slit 22 has been cut in the intermediate part 25. The battery shell has been sealed using a sealing compound 63. The sealing compound 63 also glues the first part of the conductive strip 20 to the top part 61 of the battery shell and the second part of the conductive strip 20 to the bottom part 62 of the battery shell.

Figure 6B:
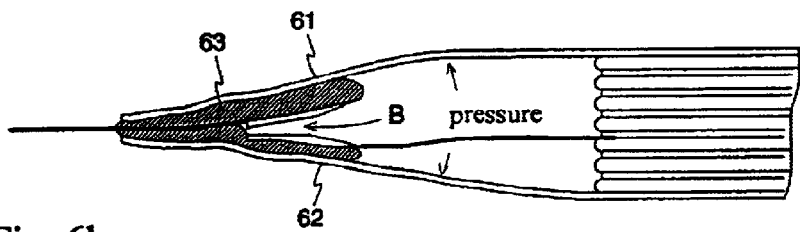

FIG. 6b shows the situation of the construction described above after the protection has worked. Misuse of battery has caused gas to be generated inside the battery, causing pressure which has bulged the battery shell. The first part of the conductive strip 20 attached to the top part of the battery shell has followed the top part of the shell upwards, and the second part of the conductive strip attached to the bottom part of the shell has followed the bottom part of the shell downwards. As a consequence, the conductive strip has been torn in two. Tear B starts at slit 22 because at that point a relatively small force suffices to break the conductive strip. As the conductive strip is completely torn in two, the battery circuit is broken and gas generation ceases. The battery itself becomes dysfunctional but damage caused by overcharging or other misuse will be avoided.

Figure 7:
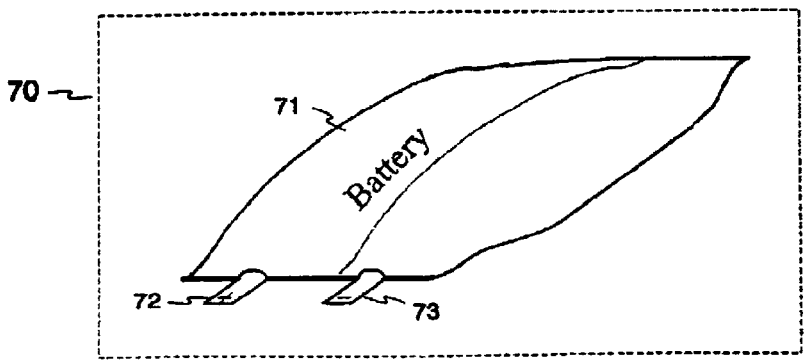
FIG. 7 shows an example of the battery according to the invention.

FIG. 7 shows an example of the appearance of a battery according to the invention. The battery 70 comprises conductive strips 72 and 73 attached to electrodes and a flexible shell 71 which is hermetically sealed using a sealing compound.

Above it was described some techniques according to the invention for preventing disadvantages caused by the formation of pressure in a battery. The invention is not limited to the techniques described above. There are many structural approaches that can be used to reduce the strength of a conductive strip at a given point. In addition, each individual approach can be implemented in various ways, such as cutting, milling, sawing, pressing or etching. Similarly, the attachment of the parts of a conductive strip to the battery. shell can be realized in many ways. The inventional idea. can be applied in numerous ways within the scope defined by the claims set forth below.

What is claimed is:

1. An arrangement for preventing a battery from causing damage to its surroundings, comprising
  a conductive strip having a certain strength and a longitudinal direction, the strip including a first portion and a second portion,
  a gastight and at least partly flexible battery shell adapted to enclose the battery into a closed space, the battery shell comprising a top part and bottom part,
  a third portion between the first and second portions of the conductive strip, the strength of the conductive strip of the third position being substantially less than the strength in the first portion and second portion, and
  an attachment of the first portion to the top part of the battery shell and an attachment of the second portion to the bottom part of the battery shell, any attachment to the battery shell being in the form of a direct attachment.

2. The arrangement of claim 1, wherein the first portion and second portion of the conductive strip are located at least partly one on top of the other.

3. The arrangement of claim 1, wherein the first portion and second portion of the conductive strip are located one after the other in the longitudinal direction of the conductive strip.

4. The arrangement of claim 1, comprising in said third portion a slit on one side of the conductive strip for reducing the strength of the conductive strip.

5. The arrangement of claim 1, comprising in said third portion perforations for reducing the strength of the conductive strip.

6. The arrangement of claim 1, wherein said attachments of the first portion and second portion to the corresponding parts of said battery shell is based on gluing.

7. The arrangement of claim 1, wherein the attachment of at least one portion of the conductive strip to the corresponding part of said battery shell is based on a protrusion on said portion, which protrusion reaches to said battery shell.

* * * * *